(12) United States Patent
Amacker et al.

(10) Patent No.: US 10,325,117 B2
(45) Date of Patent: *Jun. 18, 2019

(54) QUICK USAGE CONTROL

(71) Applicant: A9.com, Inc., Palo Alto, CA (US)

(72) Inventors: Matthew Warren Amacker, Santa Clara, CA (US); Dawn R. Dodd, San Jose, CA (US)

(73) Assignee: A9.COM, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/716,300

(22) Filed: Sep. 26, 2017

(65) Prior Publication Data
US 2018/0046818 A1 Feb. 15, 2018

Related U.S. Application Data

(63) Continuation of application No. 15/009,347, filed on Jan. 28, 2016, now Pat. No. 9,805,219, which is a continuation of application No. 13/593,806, filed on Aug. 24, 2012, now Pat. No. 9,268,966.

(51) Int. Cl.
G06F 7/04 (2006.01)
G06F 21/62 (2013.01)

(52) U.S. Cl.
CPC ........ G06F 21/629 (2013.01); G06F 21/6218 (2013.01); *G06F 2221/2137* (2013.01); *G06F 2221/2149* (2013.01)

(58) Field of Classification Search
CPC .............. G06F 21/629; G06F 21/6218
USPC .............................. 726/2–5, 26–30
See application file for complete search history.

(56) References Cited

U.S. PATENT DOCUMENTS

| | | | |
|---|---|---|---|
| 2004/0123135 A1* | 6/2004 | Goddard | H04N 7/163 726/27 |
| 2005/0060565 A1* | 3/2005 | Chebolu | H04L 63/102 726/26 |
| 2008/0256643 A1* | 10/2008 | Jones | G06F 21/629 726/27 |

(Continued)

OTHER PUBLICATIONS

Santisarun et al., "Social network monitoring application for parents with children under thirteen," Knowledge and Smart Technology (KST), 2015 7th International Conference on 2015, pp. 75-80.*

(Continued)

*Primary Examiner* — Roderick Tolentino
(74) *Attorney, Agent, or Firm* — Hogan Lovells US LLP

(57) ABSTRACT

One or more elements on a computing device can be selected and locked from use. For example, a first user (e.g., adult) of a computing device can allow a second user (e.g., child) to use the former's device; however, the first user might not want the second user to have access to all of the elements on the device, and so the first user can select which elements he/she wants to share with the second user and which elements he/she does not want to share. For example, the first user can select elements and choose to lock the selected elements, lock all other elements, lock the selected elements for a certain period of time, or lock the selected elements but allow for earned usage, etc. The lock can be removed in response to an unlock event, which can comprise a user-initiated unlock, a timed unlock, or a user-earned locked.

18 Claims, 13 Drawing Sheets

(56) References Cited

U.S. PATENT DOCUMENTS

| | | | |
|---|---|---|---|
| 2008/0317292 A1* | 12/2008 | Baker | G06K 9/00006 |
| | | | 382/115 |
| 2009/0158423 A1 | 6/2009 | Orlassino | |
| 2009/0227232 A1* | 9/2009 | Matas | H04M 1/665 |
| | | | 455/411 |
| 2011/0184855 A1* | 7/2011 | Webber | G06Q 20/10 |
| | | | 705/39 |
| 2012/0023548 A1* | 1/2012 | Alfano | G06F 21/6218 |
| | | | 726/2 |
| 2012/0023673 A1 | 2/2012 | Hornbach | |
| 2012/0144330 A1* | 6/2012 | Flint | G06F 3/04847 |
| | | | 715/765 |
| 2012/0157049 A1* | 6/2012 | Eliovits | G06F 21/53 |
| | | | 455/411 |
| 2012/0215328 A1* | 8/2012 | Schmelzer | G06F 19/3481 |
| | | | 700/91 |
| 2013/0017806 A1* | 1/2013 | Sprigg | H04M 1/66 |
| | | | 455/411 |
| 2013/0052993 A1* | 2/2013 | Kwon | G06F 21/36 |
| | | | 455/411 |
| 2013/0122882 A1 | 5/2013 | Patel | |
| 2013/0160110 A1 | 6/2013 | Schechter | |
| 2013/0203397 A1 | 8/2013 | Vidal | |

OTHER PUBLICATIONS

Cioffi et al., "An anomaly-based system for parental control," High Performance Computing & Simulation, 2009. HPCS '09. International Conference on Year: 2009, pp. 193-199.*

U.S. Notice of Allowance dated Oct. 15, 2015 issued in U.S. Appl. No. 13/593,806.

U.S. Non-Final Office Action dated Jan. 17, 2014 issued in U.S. Appl. No. 13/593,806.

U.S. Final Office Action dated Jun. 23, 2014 issued in U.S. Appl. No. 13/593,806.

U.S. Non-Final Office Action dated Apr. 15, 2015 issued in U.S. Appl. No. 13/593,806.

Santisarun et al. "Social network monitoring for parents with children under thirteen," Knowledge and Smart Technology (KST), 2015 7th International Conference on 2015, pp. 75-80.

U.S. Non-Final Office Action dated Oct. 12, 2016 issued in U.S. Appl. No. 15/009,347.

U.S. Notice of Allowance dated Aug. 3, 2017 issued in U.S. Appl. No. 15/009,347.

* cited by examiner

QUICK USAGE CONTROL

RELATED APPLICATIONS

This application is a continuation of allowed U.S. application Ser. No. 15/009,347, entitled "QUICK USAGE CONTROL" filed Jan. 28, 2016, which is a continuation of U.S. application Ser. No. 13/593,806, now U.S. Pat. No. 9,268,966, entitled "QUICK USAGE CONTROL" filed Aug. 24, 2012; of which the full disclosures are incorporated herein by reference for all purposes.

BACKGROUND

Computing devices are often shared between multiple users. It is common for a parent who has a computing device to let at least one child use the device. Sometimes, a parent may desire to prevent the child from using certain applications or a certain portion of an application. For example, the parent might have important information in his/her email or banking applications such that he/she does not want to give the child access to those applications. In another example, the parent might let the child browse an Internet electronic market, but might not want the child to buy anything. In a further example, the parent might want the child to only use educational and productive applications, but not play any games; in other words, the parent wants to allow the child to use only a few applications (e.g., educational, productive) but not others (e.g., games). In a further example, the computing device can be shared between two (or more) friends or mere acquaintances. However, conventional approaches typically need for each user of a computing device to sign up for a profile/account so that usage controls, parental controls, etc. can be managed. Moreover, each time a user wants to use another user's device, the former has to sign in again. This can be cumbersome, slow, and inefficient. Accordingly, there needs to be an improved approach to sharing devices and controlling permissions.

BRIEF DESCRIPTION OF THE DRAWINGS

Various embodiments in accordance with the present disclosure will be described with reference to the drawings, in which.

DETAILED DESCRIPTION

Figure 1:
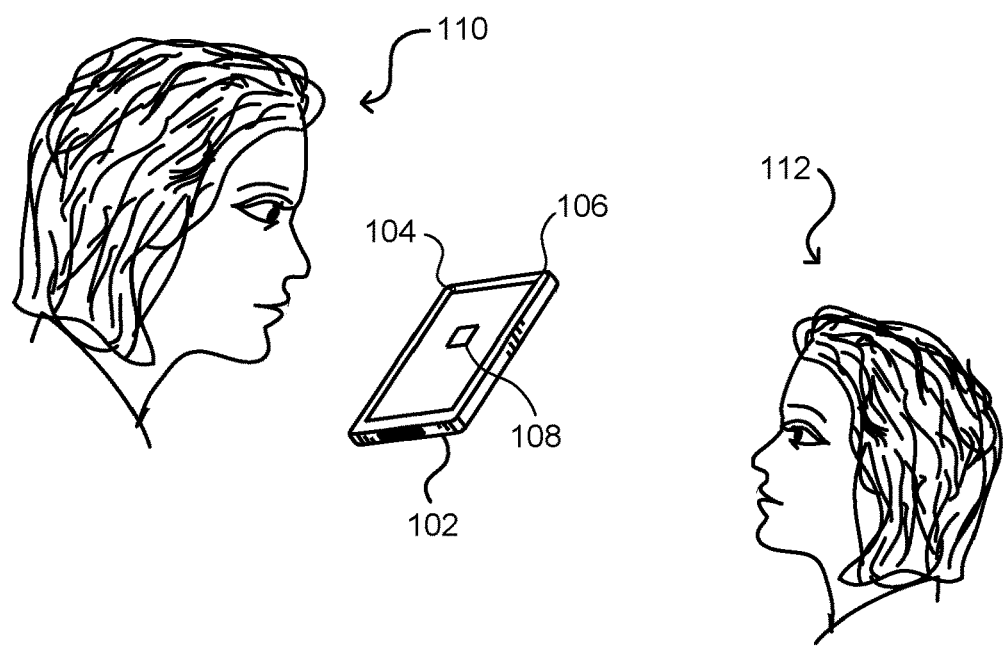
FIG. 1 illustrates an example environment in which aspects of the various embodiments can be utilized.

Systems and methods in accordance with various embodiments of the present disclosure overcome one or more of the above-referenced and other deficiencies in conventional approaches to computing usage control. In particular, various embodiments can provide for quick control of computing usage, such as which applications or content are accessible in a current state on a computing device.

At least some embodiments enable a user to apply usage control settings by applying a specified input to an element associated with an application on a computing device. An element can comprise at least a portion of an application, such as a button or component within the application, an interface (or a portion of the interface) for the application, an operation performable (e.g., capable of being performed) by the application (e.g., a functionality of the application), or the entire application. Some elements (e.g., applications, portions of an application, operations/functionalities of an application, etc.) can promote education and/or productivity, while others provide entertainment. Elements can be used to perform a wide variety of tasks.

In some embodiments, one or more elements can be installed, running, or otherwise residing on the computing device. In an example, a first user (e.g., an adult parent) of the computing device is about to give access of his/her computing device to a second user (e.g., a child). However, the first user remembers that he/she has some personal emails, text messages, or other private information that he/she does not want the second user to see. It may be cumbersome, time-consuming, and inconvenient to try to set up a profile/account for the second user and then configure the profile settings for the second user to exclude the elements personal to the first user. As such, a quick way to lock up the elements would be very helpful.

In some embodiments, the first user can select the one or more elements (e.g., applications, portions of an application, operations of an application, etc.) that he/she does not want to share with the second user. For example, the first user can tap, press, and hold the elements or draw a selection box incorporating the elements in order to select them, which can bring about options for the first user to choose. Various options can be presented to the first user in response to the selecting of the one or more elements. The various options can include but is not limited to options to lock the selection of elements (e.g., lock the applications or the portions of applications associated with the selected elements), lock all elements other than the selected elements, lock the selection for a certain duration of time, lock everything other than the selection for a certain duration of time, lock the selection but allow for earned usage, lock everything other than the selection but allow for earned usage, lock the selection for a certain duration of time but allow for earned usage, lock everything other than the selection for a certain duration of time but allow for earned usage, etc. When the first user chooses one of the above example options, the selected elements (i.e., the applications associated with the selected elements) become locked (e.g., are put into a locked state).

Continuing with the above example, if the first user then gives his/her device to the second user, the second user will not be able to access those selected and locked elements (i.e., applications associated with the elements). Nonetheless, the second user can still use any element that is not locked. As such, the first user can still offer the device for the second user to use, without sacrificing privacy or too much time.

The selected elements can be unlocked (e.g., removed from a locked state) in response to an "unlock event." In some embodiments, an unlock event can comprise an unlock initiated by the first user, an automatic timed unlock, or an unlock earned by the second user. In some embodiments, the user can initiate the unlock by entering a passcode, passing a facial recognition test, and/or a biometric authentication. In some embodiments, the locked elements are unlocked automatically when a specified duration of time has passed. In some embodiments, the locked elements are unlocked when the second user has earned usage privileges. For example, if the first user locked a gaming app but setup the device such that the second user can earn an unlock by using a homework app for a specified amount of time, then when the second user has used the homework app for the specified amount of time, the gaming app will unlock (e.g., for a certain during of time).

FIG. 1 illustrates an example environment in which aspects of the various embodiments can be utilized. The example environment 100 can include a computing device 102, which can comprise one or more cameras 104, a display screen 106 (e.g., touchscreen), and at least one element 108 installed and/or executing on the device 102. In some embodiments, the at least one element 108 can comprise at least a portion of an application. For example, an element can include a button in an application, an area on an interface of an application (e.g., an area on a webpage rendered by a web browsing application), an operation/functionality of the application, and/or an entire application (e.g., software, program, game, mobile app, etc.).

As shown in FIG. 1, there can also be one or more users (e.g., 110, 112, etc.) of the computing device 102. For example, the one or more users can include at least two users (e.g., 110 and 112). The first user 110 can be, for example, a primary user of the device 102, who may wish to let the second user 112 use the device 102 as well. However, perhaps the first user 110 has an email application, a text messaging application, and/or other elements/applications that the first user 110 does not want the second user 112 to use or access. For example, the first user 110 is about to hand over the device 102 to the second user 112 but remembers that he/she does not want to share certain elements with the second user 112 (e.g., does not want to give access of certain elements to the second user 112). As such, it would be useful for the first user 110 to quickly lock those applications/elements before letting the second user 112 use the computing device 102.

For example, the one or more users can include an adult parent and a child. The adult parent user 110 can allow his/her child 112 to use certain applications (e.g., element 108) on the device 102. For example, the parent user 110 may wish to allow the child user 112 to only use educational applications and prevent the child 112 from playing with gaming applications (or playing with the gaming applications too much). In some embodiments, the parent user 110 can allow the child user 112 to use certain applications for only a limited amount of time, after which the applications will become locked. For example, the parent user 110 can configure the device 102 such that the child user 112 can only play a gaming application for 30 minutes. In some embodiments, the parent user 110 can configure the device 102 such that the child user 112 can only "earn" the privilege to use certain applications (e.g., gaming applications) in response to using other applications (e.g., educational applications). For example, the parent 110 can configure the device 102 such that the child 112 can only play a gaming application (e.g., for a limited amount of time) in response to using a homework application for a specified amount of time. In some embodiments, the limited time usage and earned usage can work in combination. For example, the device can be configured such that if the child 112 has already used up the limited time for using a particular application (and the application becomes locked), the child 112 can earn more time to use the application (e.g., unlocking the application for a certain amount of time depending upon how much time the child earned), such as by using another application for a specified amount of time.

In another example, the device 102 can be shared by multiple users, each of whom can have one or more applications that he/she does not want to share with the rest of the users. Accordingly, each user can lock his/her respective application(s) to prevent other users from using those applications. In some embodiments, this lock can be for an indefinite duration and can be opened only by the appropriate user (e.g., the user who placed the lock).

In a further example, a user can wish to lock himself/herself from certain applications. For example, if a user knows that he/she needs to focus on a homework application but also knows that he/she is easily distracted, he/she can lock gaming and entertainment applications to force him/her to focus on the homework application. In some embodiments, the user can set a timed lock such that the gaming and entertainment applications are locked for a certain amount of time (e.g., 45 minutes from now, until 9:00 PM, etc.), wherein the lock cannot be readily/easily removed by the user (e.g., by entering a passcode) before the amount of time has passed. In some embodiments, the user can set the device to unlock the gaming and entertainment applications only after the user has spent a specified amount of time using the homework application.

Figure 2A:
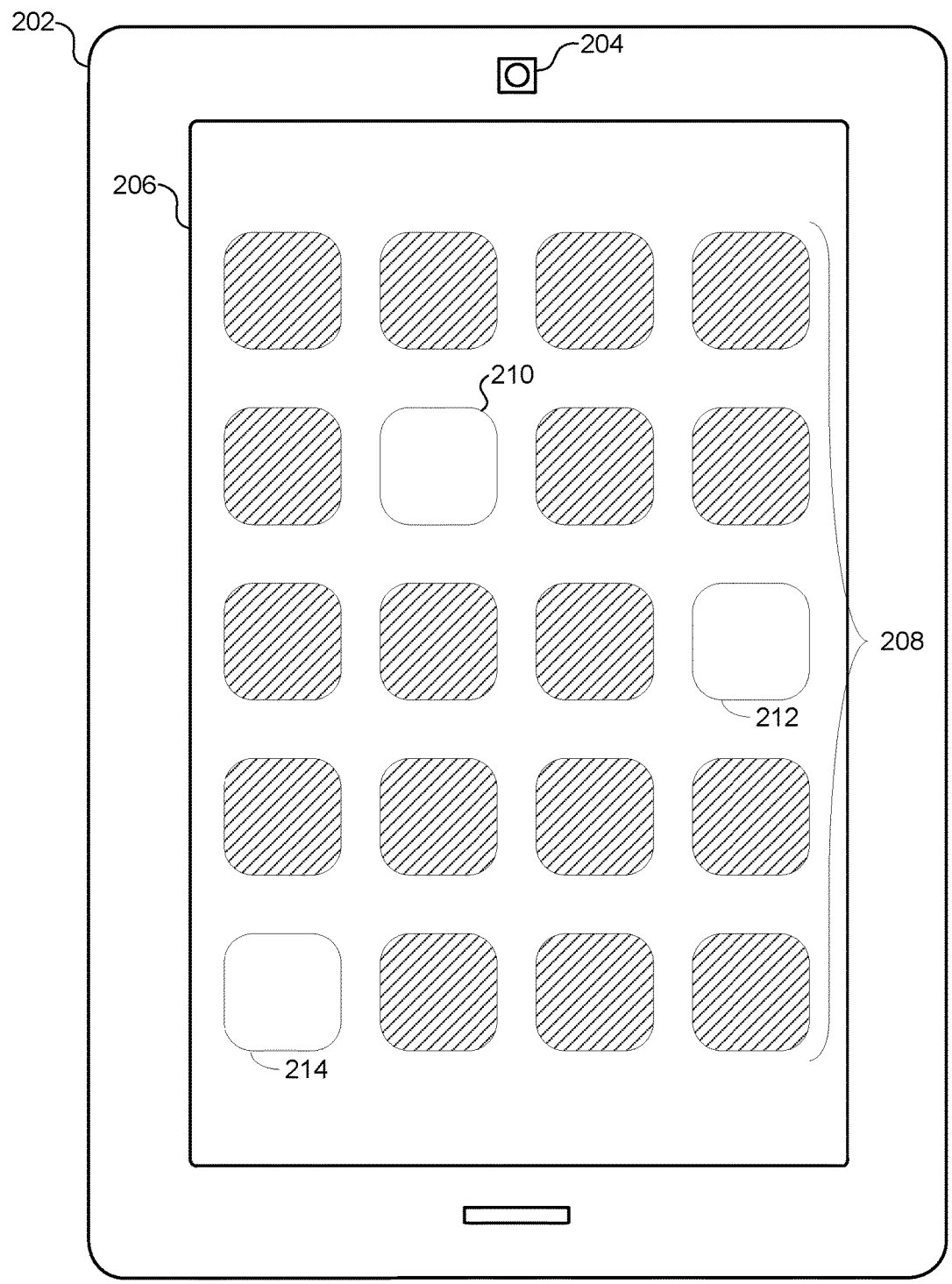
FIG. 2A illustrates an example device embodiment for quick usage control.

FIG. 2A illustrates an example device embodiment for quick usage control. The example device embodiment 202 of FIG. 2A can comprise at least one camera 204, a display screen 206 such as a touch screen (i.e., display screen with touch sensor), and one or more elements 208 (e.g., applications, portions of an application(s), etc.) installed and/or running on the computing device 202.

As illustrated in FIG. 2A, the one or more elements 208 can be associated with a plurality of applications presented as icons on the display screen 206 of the example computing device embodiment 202. In some embodiments, a user (e.g., the first user 110) can tap to select one or more elements (e.g., applications, icons, etc.). For example, the user can tap icons 210, 212, and 214. The user can be presented with various options, such as an option to lock (the applications associated with) the selected elements or an option to lock (applications associated with) all other elements other than the selected elements. In FIG. 2A, the user has chosen, for example, to lock all other elements but to leave the selected elements (e.g., 210, 212, and 214) unlocked.

Figure 2B:
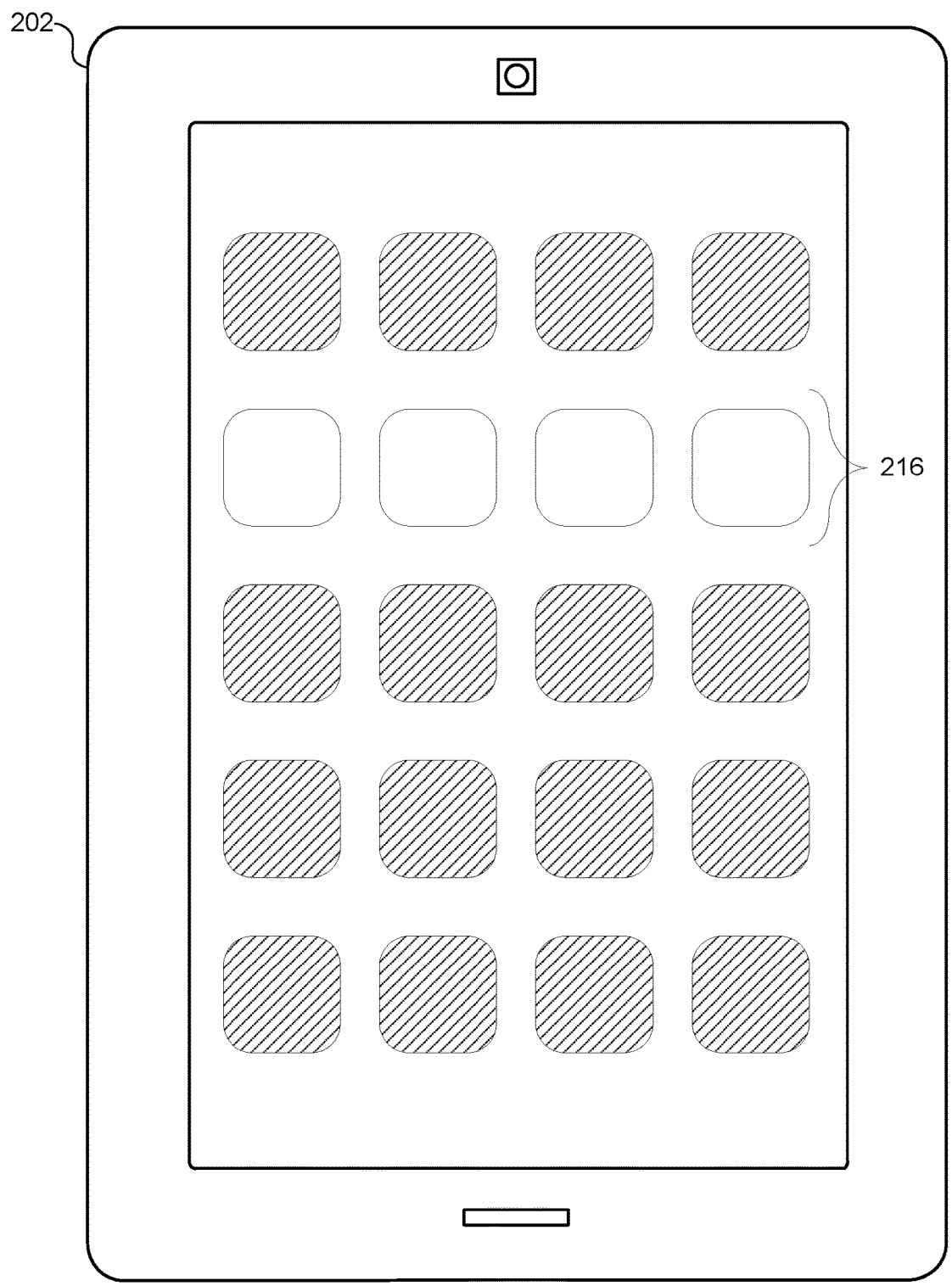
FIG. 2B illustrates an example device embodiment for quick usage control.

FIG. 2B illustrates an example device embodiment for quick usage control. In the example shown in FIG. 2B, the user can select a row(s) of elements 216. The user can be presented with various options, such as to lock the selected row of elements 216 for a certain duration of time or to lock all other elements for a certain duration of time. In some embodiments, the user can place (e.g., drag and drop) elements on a bookshelf, select the bookshelf (e.g., bookshelf row), and be presented with various options for the selected bookshelf. It is also contemplated that the user can select a column(s), or any combination of rows and/or columns.

Figure 2C:
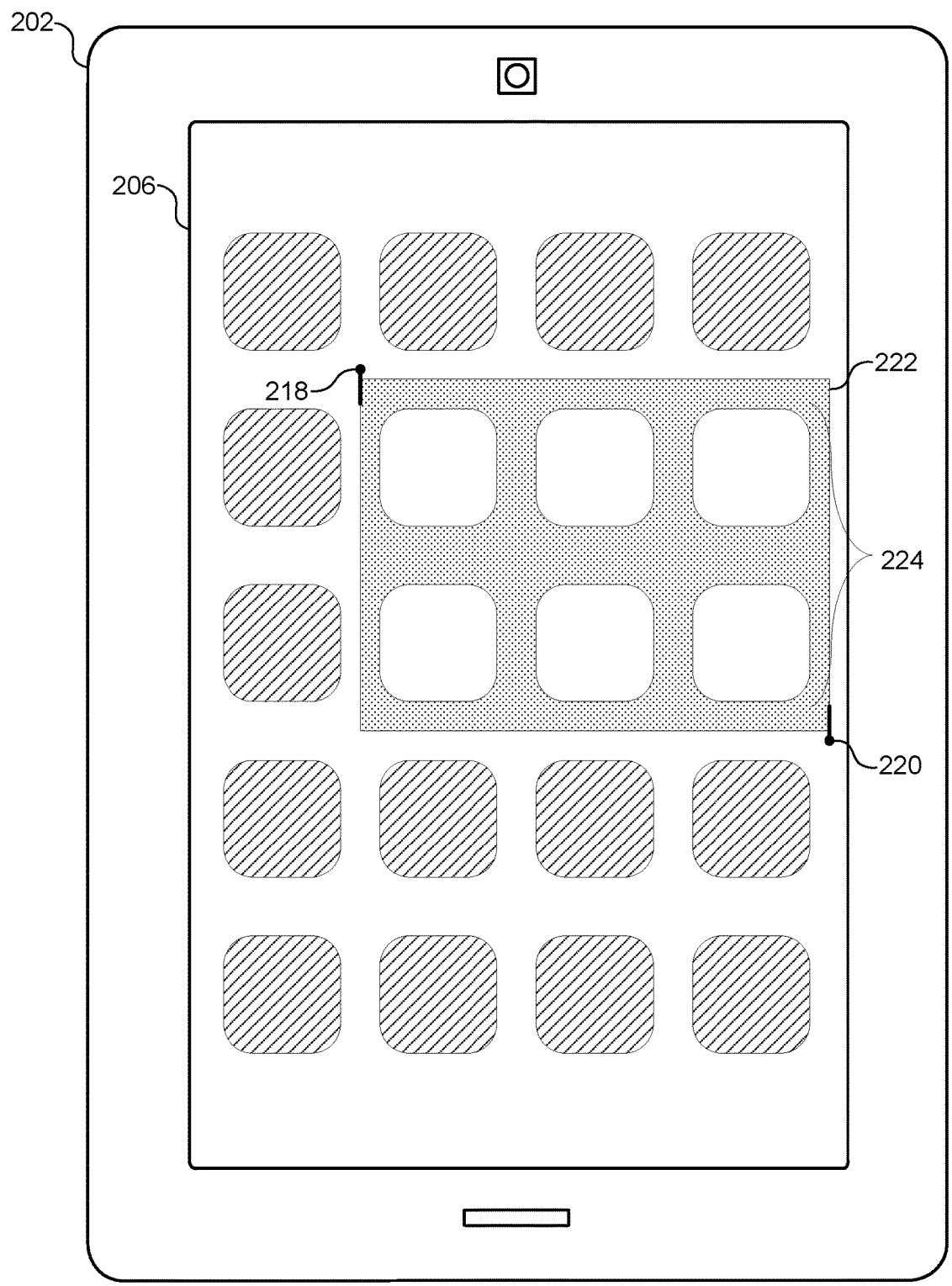
FIG. 2C illustrates an example device embodiment for quick usage control.

FIG. 2C illustrates an example device embodiment for quick usage control. In some embodiments, the user can draw a box to select one or more elements. For example, as shown in FIG. 2C, the user can draw a selection box by tapping and holding an area on the display screen 206 (e.g., touch screen) to form one corner (e.g., upper left corner) 218 of the selection box, drag his/her tapping finger to another area and remove his/her tapping finger from touching the screen 206 to mark an opposite corner (e.g., bottom right corner) 220, thereby creating the selection box 222.

In some embodiments, one or more elements 224 within the selection box 222 can be deemed as being selected by the user when the user draws the selection box 222 to incorporate the one or more elements 224. In response to the selection, the user can be presented with various options with regard to usage permissions relating to the one or more elements 224 within the selection box 222.

Figure 2D:
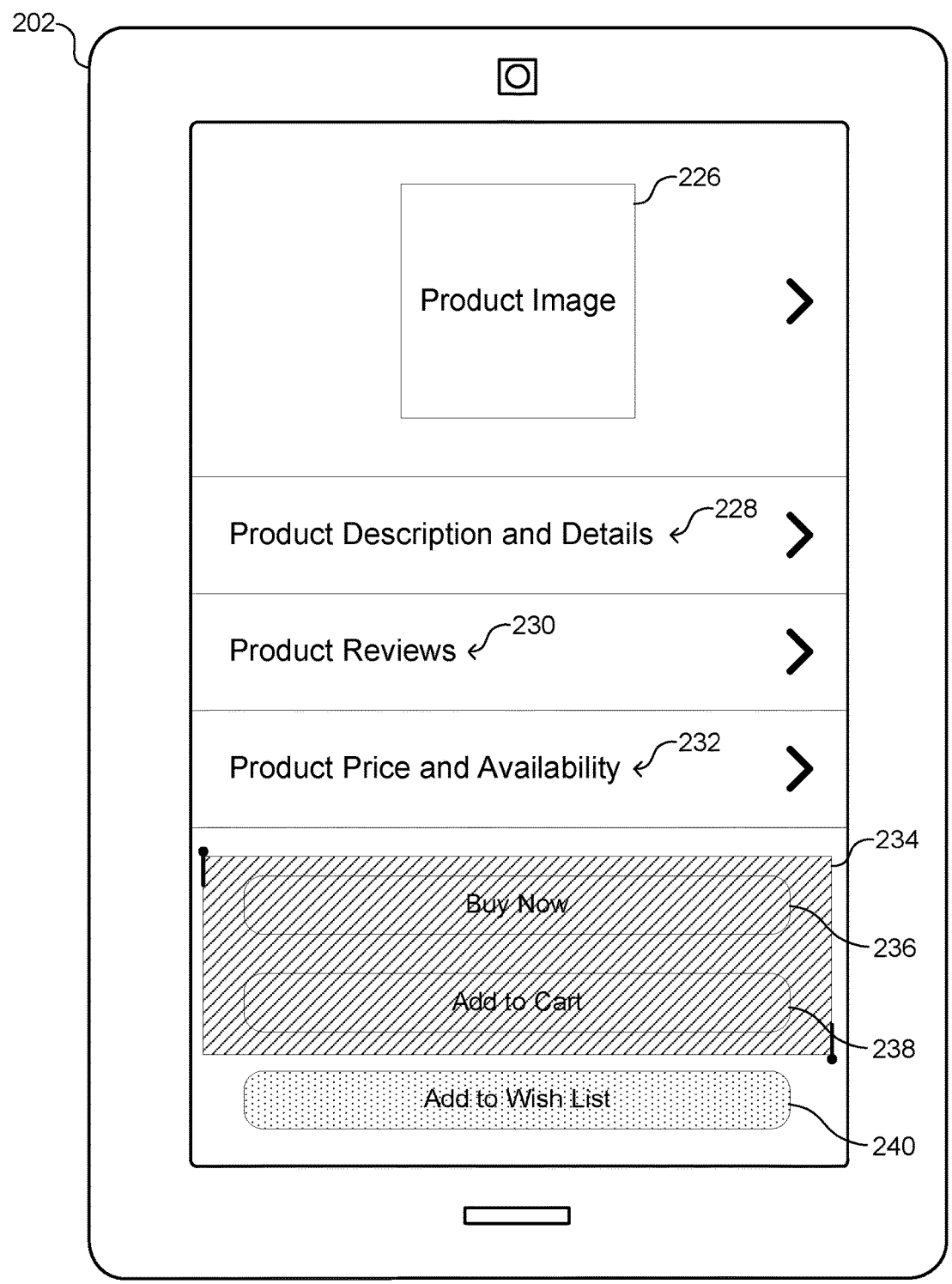
FIG. 2D illustrates an example device embodiment for quick usage control.

FIG. 2D illustrates an example device embodiment for quick usage control. The example device embodiment 202 in FIG. 2D can present an interface for an application. In the example of FIG. 2D, the application can be an app for shopping in an electronic marketplace. In some embodiments, the entire application can be an element. In some embodiments, any portion of the application (e.g., an interface or a portion of the interface of the application, a button/component of the application, an area displayed on screen for the application, an operation/functionality of the application, etc.) can be an element. For example, as shown in FIG. 2D, there can be elements such as a product image 226, an area for providing a product description and details 228, an area for providing reviews 230, an area for price and availability 232, various buttons (e.g., 236, 238, 240, etc.), and/or other portions/components.

As shown in FIG. 2D, the user can draw a selection box 234 around one or more elements to select them. For example, the user can select an area which incorporates the "Buy Now" button element 236 and the "Add to Cart" button element 238, and choose to lock the two elements. When the elements 236 and 238 are locked (i.e., in a locked state), they cannot be used. Continuing with the example, the user can be a parent who wants to let his/her child use the device (including the shopping application) but does not want the child to buy anything or add anything to a shopping cart in the shopping application.

In some embodiments, one or more elements (e.g., applications, portions of the application) such as the product image and/or product information can be locked (e.g., put in a locked state) by censoring the images and/or text related to the product image/information. For example, if the user draws a selection box around the product image 226 and the product description/details 228, and chooses to lock the selection, then the images and text relating to those elements will be censored (e.g., blacked out, made not to be fully/clearly visible, etc.).

Figure 2E:
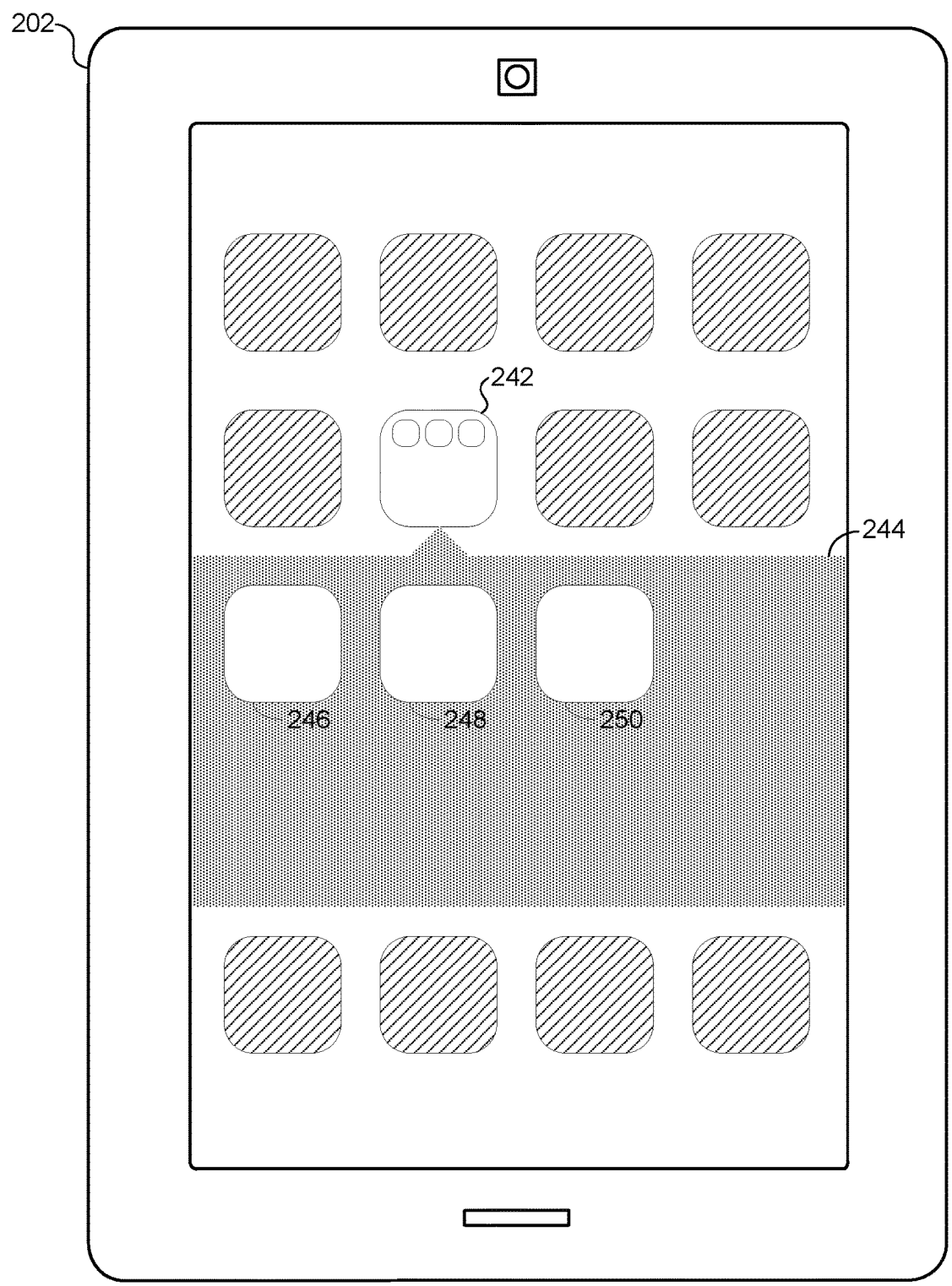
FIG. 2E illustrates an example device embodiment for quick usage control.

FIG. 2E illustrates an example device embodiment for quick usage control. The example device 202 in FIG. 2E shows an icon 242 representing a folder 244, which can hold applications (e.g., elements) 246, 248, and 250. The user can tap the icon 242 to select the folder 244 and choose a lock option with regard to the folder 244 (and the elements 246, 248, and 250 within the folder 244). For example, the user can tap and hold the icon 242 for the folder 244 or draw a selection box around the icon 242 for the folder 244 to select the folder 244, and choose, from a plurality of options presented, to lock all other elements outside of the folder 244, as shown in FIG. 2E. As such, only elements 246, 248, and 250 within the folder 244 are unlocked (i.e., not in a locked state) and can be used. It is also contemplated that other grouping structures, such as directories or carousels, can be used in accordance with the various embodiments disclosed.

Figure 2F:
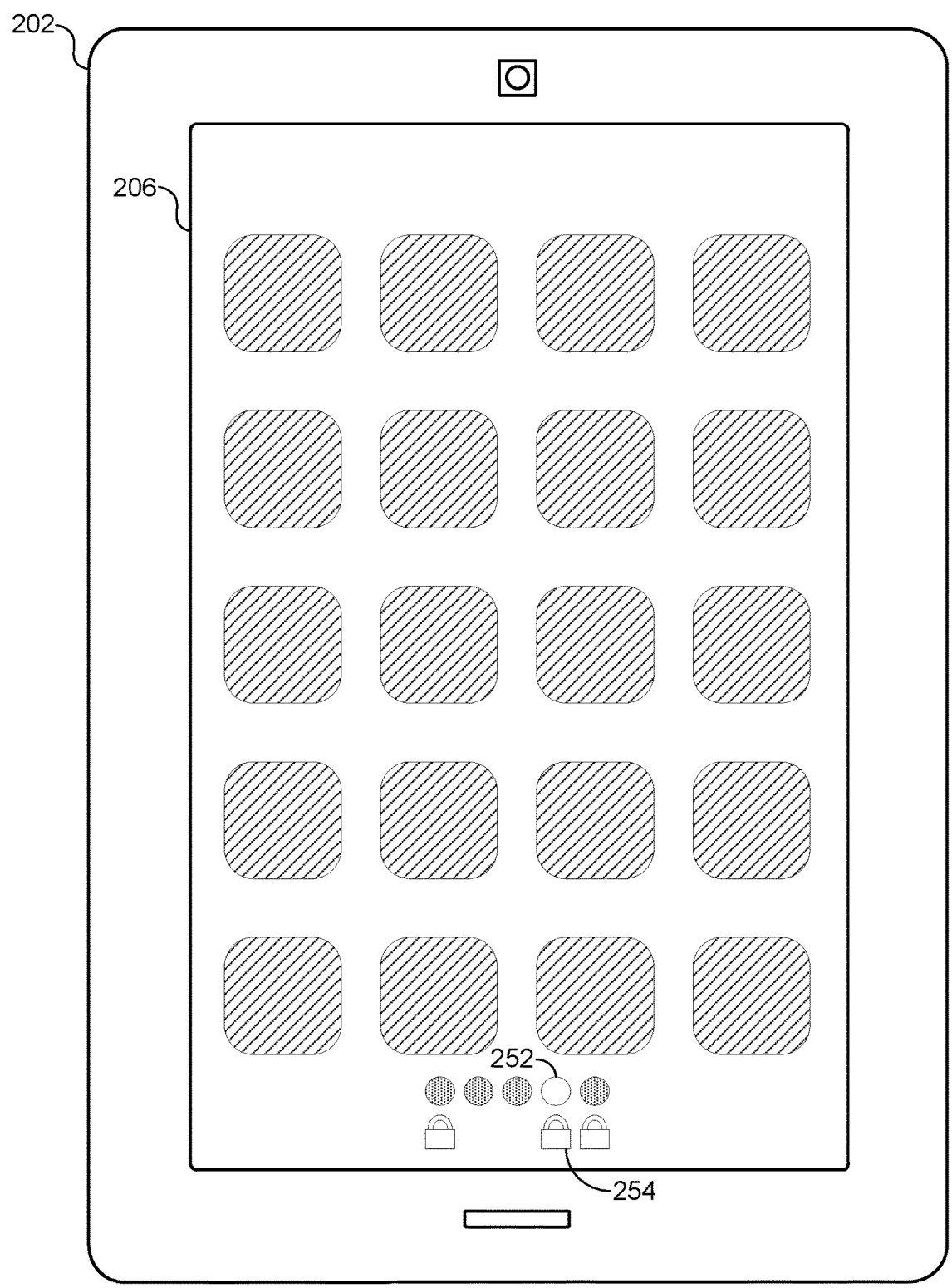
FIG. 2F illustrates an example device embodiment for quick usage control.

FIG. 2F illustrates an example device embodiment for quick usage control. In some embodiments, entire pages or panes can be locked, as shown in FIG. 2F. In the example device embodiment 202 of FIG. 2F, the entire page is locked. For example, each page (e.g., home screen, home page, home pane, etc.) can be represented as a dot on the bottom portion of the display screen 206. The dot representing the current page 252 can be displayed on screen as being highlighted, while the dots representing the remaining pages are grayed out or not highlighted.

In some embodiments, the user can select (e.g., by tapping/pressing) the dot representing a particular page to bring up locking options regarding the page. For example, the user can tap and hold the dot 252 representing the current page being displayed in FIG. 2F. Options can be presented to the user and the user can choose to lock the current page (e.g., put the current page into a locked state). In some embodiments, the options presented in response to selecting the current page can include options to lock one or more pages other than the current page. In some embodiments, when a page is in a locked state, there can be an indicator 254 to indicate that the page is locked. As illustrated in the example of FIG. 2F, the current page is the fourth page and the locked pages are the first, fourth (current), and fifth pages.

Figure 3:
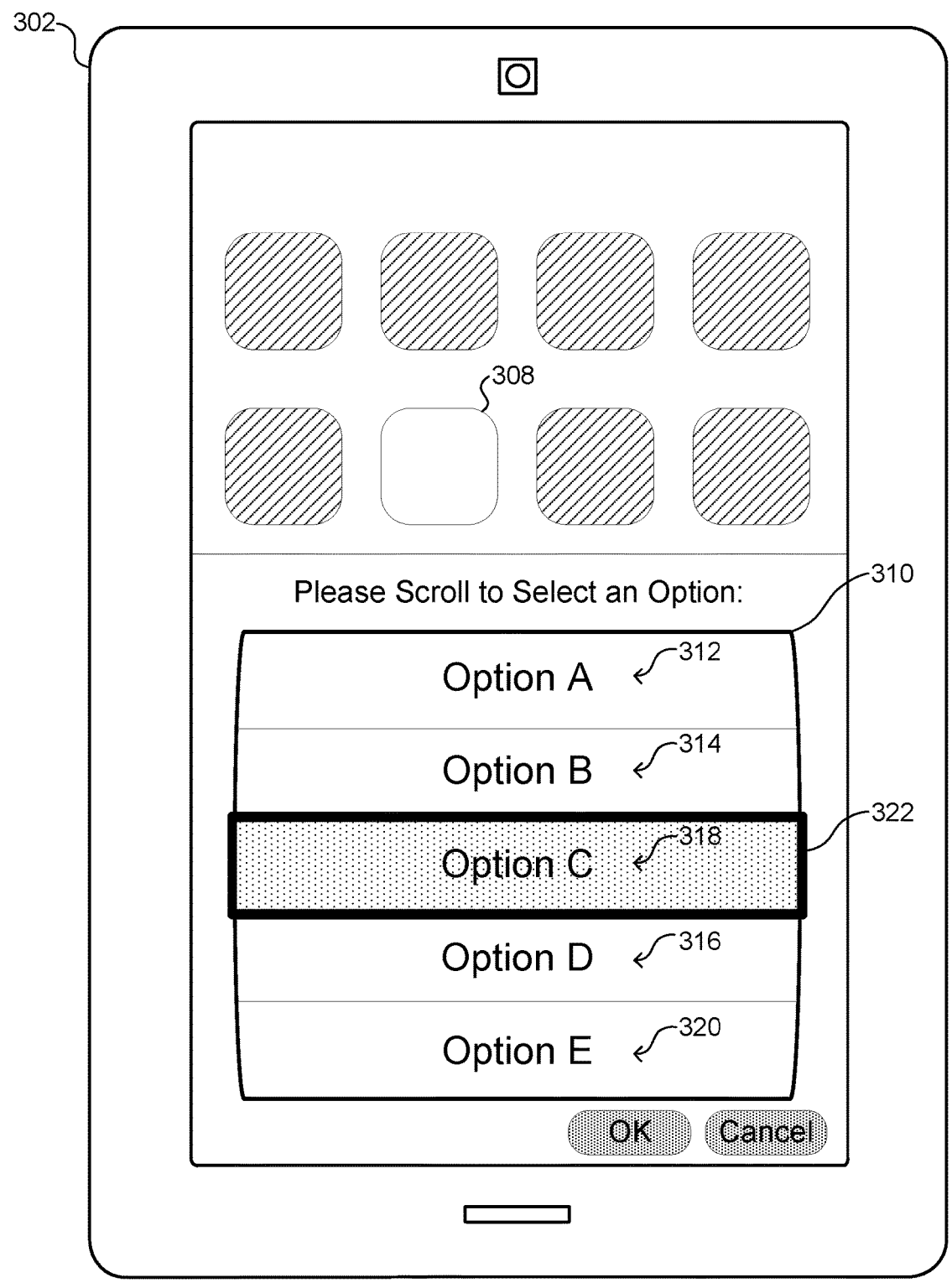
FIG. 3 illustrates an example device embodiment for quick usage control.

FIG. 3 illustrates an example device embodiment for quick usage control. The example in FIG. 3 illustrates various options that can be presented when the user selects one or more elements. For example, the user can select an element (e.g., an application or a portion thereof) 308, a row of elements, an area incorporating an element, a folder of elements, or a page of elements, etc. (e.g., by tapping/pressing, by drawing a selection box, etc.). In response to the selection, various options can be presented to the user with regard to usage permissions relating to the selection.

In some embodiments, a menu such as a pull down menu or a scroll menu 310 can be utilized to present to the user the various options (e.g., Option A 312, Option B 314, Option C 316, Option D 318, Option E 320, etc.). With regard to the example scroll menu 310, the user can scroll through the options until the option he/she wants to choose is in the selected slot 322. Moreover, it is fully contemplated that there are numerous others ways to present the various options for the user to choose.

In some embodiments, the various options can include, but is not limited to, options to lock the selection (e.g., applications, portions of applications, etc.), lock everything other than the selection, lock the selection for a certain duration of time, lock everything other than the selection for a certain duration of time, lock the selection but allow for earned usage, lock everything other than the selection but allow for earned usage, lock the selection for a certain duration of time but allow for earned usage, lock everything other than the selection for a certain duration of time but allow for earned usage, etc.

Figure 4:
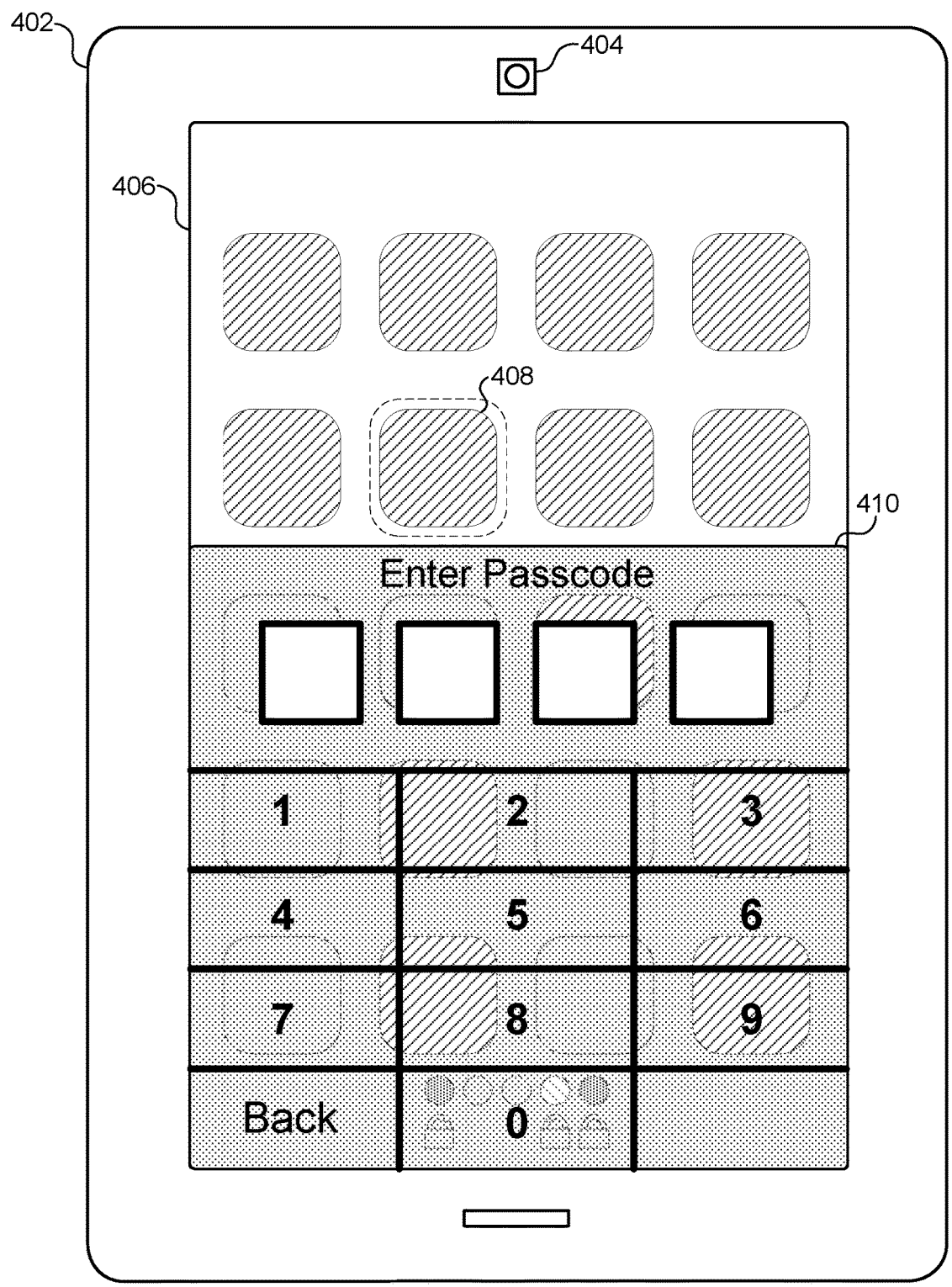
FIG. 4 illustrates an example device embodiment for quick usage control.

FIG. 4 illustrates an example device embodiment for quick usage control. The example device embodiment 402 can comprise at least one camera 404 and a display screen 406 such as a touch screen. In some embodiments, one or more elements that are in a locked state can be removed from (e.g., taken out of) the locked state in response to an "unlock event." In some embodiments, an unlock event can be a successful input of a correct passcode (e.g., a passcode that was set as being the correct passcode during a configuration/initial setup process). For example, when a user wants to unlock a locked element 408, the user can select the locked element 408 and be presented with an interface 410 for inputting a passcode, as illustrated in FIG. 4. Continuing with the example, in response to a successful entry of the correct passcode, the locked element 408 can be unlocked and the now unlocked element 408 can be used.

In some embodiments, the at least one camera 404 on the example device 402 can include a front facing camera. In some embodiments, the at least one camera 404 (e.g., the front facing camera) can be utilized to trigger a unlock event. For example, the camera 404 can be utilized for facial recognition of the user attempting to trigger the unlock event. In some embodiments, during a configuration process (e.g., initial setup process), the camera 404 can capture an image of the user's face, which can be deemed as being correct and can be utilized for subsequent facial comparison and recognition/authentication.

In some embodiments, an unlock event can involve at least one of a passcode entry, facial recognition, fingerprint recognition (e.g., utilizing a fingerprint scanner on the device), voice recognition (e.g., utilizing a microphone on the device), retina recognition (e.g., utilizing a retina scanner on the device), other biometric authentications, or any combination of the preceding, etc. For example, the unlock event can correspond to a successful passcode entry, a successful biometric authentication, etc.

Figure 5:
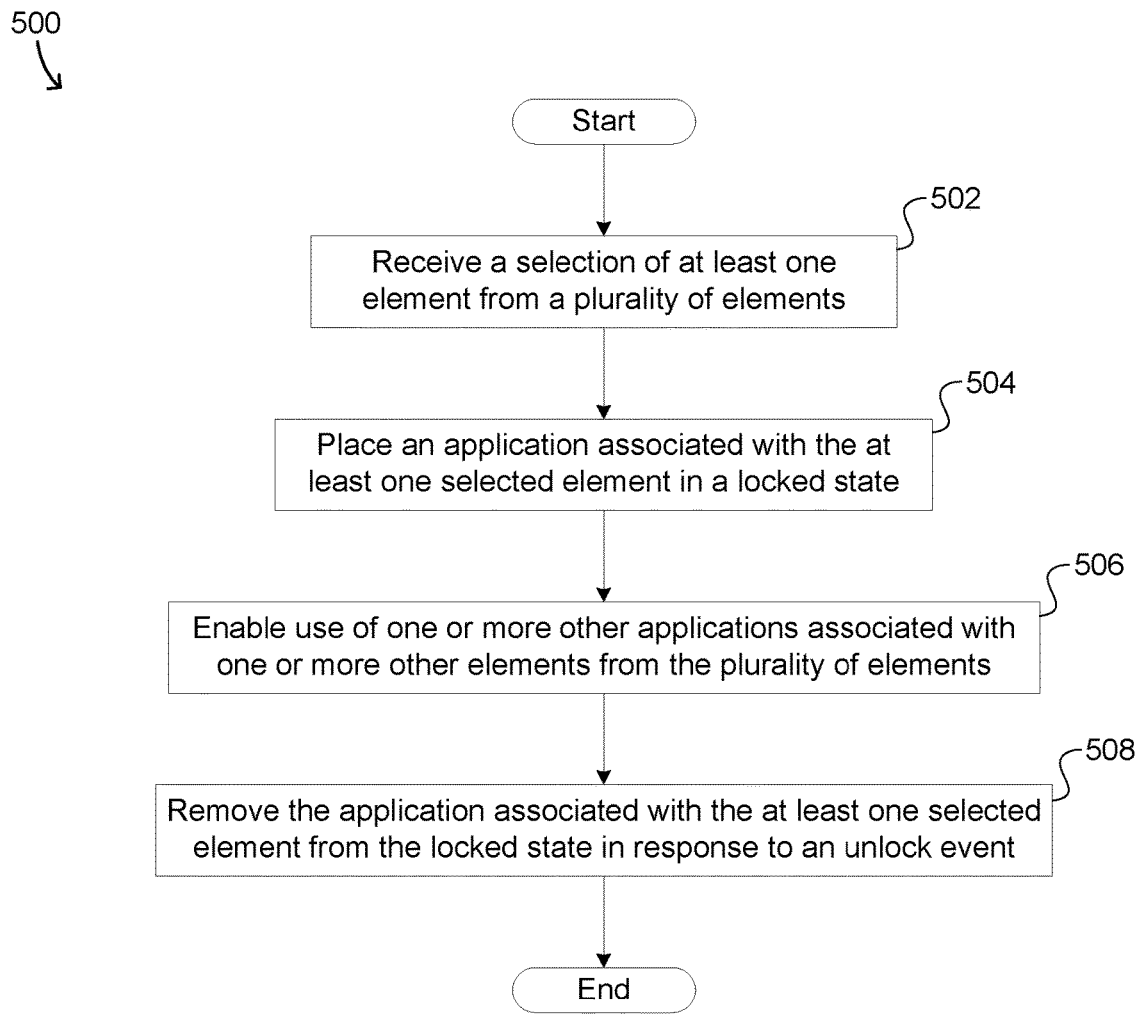
FIG. 5 illustrates an example method embodiment for quick usage control.

FIG. 5 illustrates an example method embodiment for quick usage control. It should be understood that there can be additional, fewer, or alternative steps performed in similar or alternative orders, or in parallel, within the scope of the various embodiments unless otherwise stated. In some embodiments, the example method embodiment 500 can be performed by a computing device, starting with receiving a selection, by a first user of the computing device, of at least one element from a plurality of elements on a graphic user interface displayed on a display screen of the computing device, at step 502. In some embodiments, each element in the plurality of elements is associated with an application on the computing device.

At step 504, the application associated with the at least one selected element can be placed in a locked state to prevent at least a second user of the computing device from using the application associated with the at least one selected element. For example, the first user is allowing the second user to use the first user's device but the first user does not want to share every element/capability with the second user. Nonetheless, at step 506, the second user can still be allowed to use one or more other applications associated with one or more other elements on the computing device, wherein the one or more other elements are different from the at least one selected element in the locked state.

Then at step 508, the application associated with the at least one selected element can be removed from the locked state in response to an unlock event. In some embodiments, the unlock event can include at least one of an unlock initiated by the first user, an automatic timed unlock, or an unlock earned by the second user by performing one or more specified tasks using the one or more other applications associated with the one or more other elements on the computing device.

Figure 6:
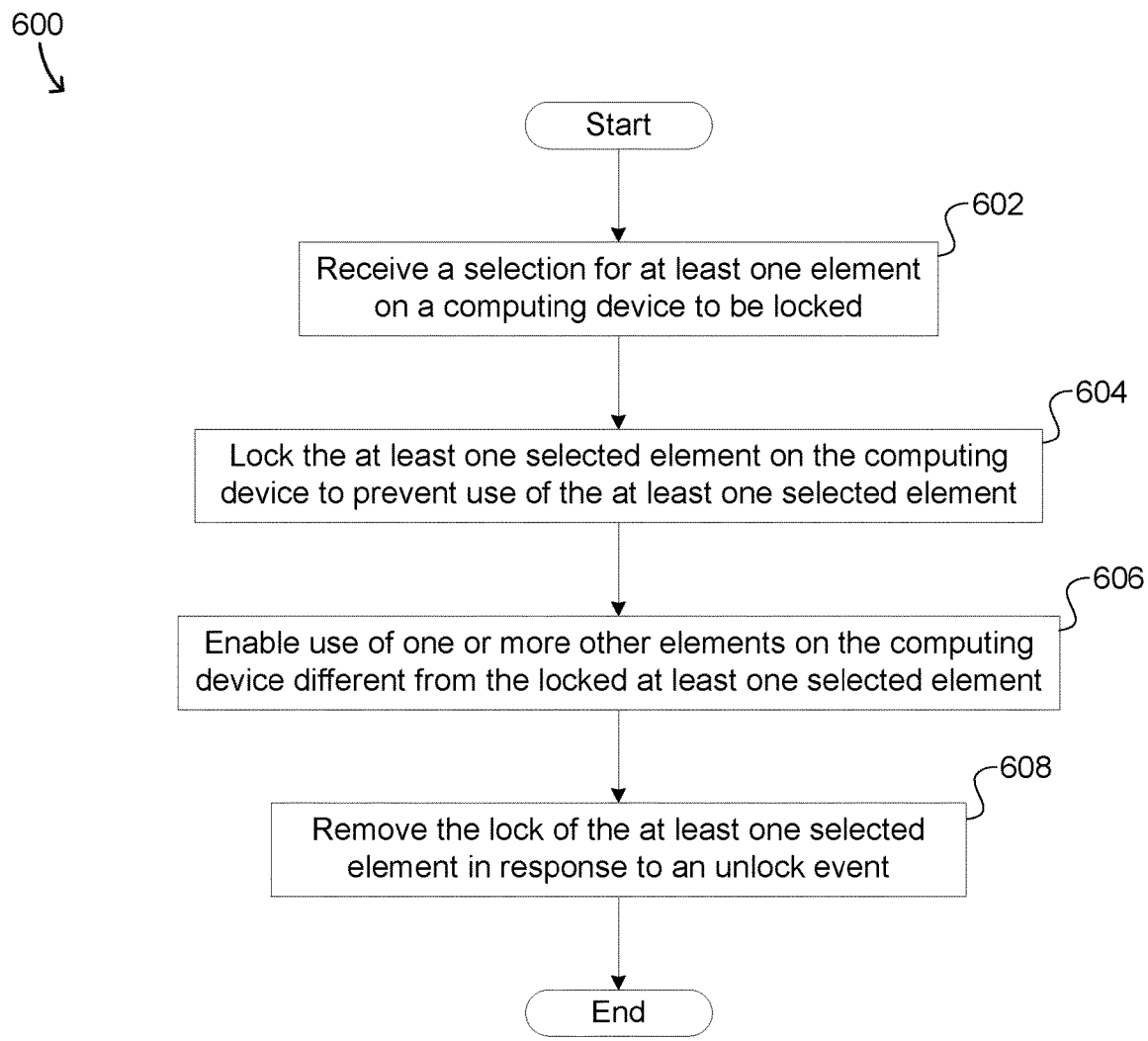
FIG. 6 illustrates an example method embodiment for quick usage control.

FIG. 6 illustrates an example method embodiment 600 for quick usage control. Again, it should be understood that there can be additional, fewer, or alternative steps performed in similar or alternative orders, or in parallel, within the scope of the various embodiments unless otherwise stated. At step 602, the example method embodiment 600 can receive a selection for at least one element on a computing device to be locked, wherein the at least one element includes at least one of a portion of an interface of an application on the computing device or an operation performable by the application. Step 604 involves locking the at least one selected element on the computing device to prevent use of the at least one selected element. Step 606 includes enabling use of one or more other elements on the computing device different from the locked at least one selected element. Then at step 608, the lock of the at least one selected element can be removed in response to an unlock event, wherein the unlock event includes at least one of a user-initiated unlock, a timed unlock, or a user-earned unlock based on using the one or more other elements.

Regarding user-earned usage, in some embodiments, the computing device can check whether a user is actively using a specified application to earn usage privileges or merely running the application idly (e.g., just having the application open), such that just running the application idly does not contribute to earning usage privileges. In some embodiments, the type of the application can be determined to check whether the application is being run idly. For example, for an electronic book (i.e., e-book) reading application, there should be an expected amount of idle time (e.g., during which the user is presumably reading the page) between page turns. In some embodiments, the number of words on the page can also be counted and the time between page turns determined, in order to estimate a reasonable amount of time spent on a page (e.g., spending 10 minutes on a 500 word page might be reasonable, but spending two hours is not). In another example, for a word processing application, 20 minutes of idle time might be reasonable (e.g., during which the user is presumed to be organizing his/her thoughts), but an hour without typing a key might not be reasonable and thus the extra time (e.g., one hour minus 20 minutes equals 40 minutes) can be made not to contribute to earning usage privileges.

In some embodiments, the lock settings/permissions can also be synced across multiple computing devices. For example, if a user has multiple devices and one or more elements are present on the multiple devices, then when the user selects an element to be placed into a locked state, each instance of the same element on the user's multiple devices can also be placed into a locked state. In some embodiments, if a first user has one or more of his/her element installed/running on a second user's device, the first user can remotely lock his/her elements present on the second user's device.

In some embodiments, there can be lock/permissions settings or a parent control center on the computing device for managing various aspects of locks and permissions (e.g., saved settings, saved passcodes, etc.). In some embodiments, for example, once a parent hands the device over to a child, the device can attempt to capture an image of the child's face and use facial recognition of the child's face to apply any saved locked settings for the child; the settings or parental control center can store and provide access to the child's picture(s) to be used for facial recognition. In another example, the settings or parental control center can be used to manage the identification numbers unique to each application.

In some embodiments, an element can be locked utilizing a rating system. For example, if a first user (e.g., parent) locks a video/movie playing application/element and chooses to set a rating filter, then only videos and/or movies that are rated G can be played by a second user (e.g., child) while the video/movie application is in the locked state. Similar approaches can be implemented for gaming, media, and other applications.

In some embodiments, an element such as a mobile banking application can be locked by a first user such that a second user will not be able to view and/or access a locked bank account of the first user. For example, if a parent has an individual account as well as a joint account with his/her child, then the parent can lock the device such that the child can only use the banking application to view/access the joint account. In some embodiments, application programming interfaces can be provided to app developers to implement capabilities such as this and others.

In some embodiments, an element such as a shopping application can be locked with respect to the maximum amount of money that can be spent in an electronic marketplace. For example, a first user can lock the amount of spending in the shopping application element such that a second user can only spend up to that amount (e.g., maximum $50 credit at Amazon.com, etc.). In another example, the first user can lock his/her own maximum spending for a certain duration of time (e.g., until the end of the month when his/her paycheck arrives).

In some embodiments, gesture-initiated lock settings can be implemented. For example, the first user can utilize a touch sensor (e.g., touch screen) on the device to draw a "J" letter with his/her finger to initiate lock settings for "Jimmy" (e.g., a second user); in response to the "J" being drawn on the touch sensor, the computing device can retrieve any saved lock settings for Jimmy and apply the lock settings for Jimmy. Similarly, in some embodiments, voice initiated lock settings can also be implemented. For example, if the first user says "Set lock for Jimmy," then the device can retrieved any saved lock settings for Jimmy and apply the lock settings for Jimmy.

Various embodiments consistent with the present disclosure can also be implemented for usage notifications. In some embodiments, the computing device can provide usage data of the application(s) used. For example, after a parent user hands the computing device over to the child user, the computing device can track which applications are being used by the child user, when those applications are being used, and/or how much time the child user is spending on them. Accordingly, a parent user can monitor how the child user is using the device. In an example, the parent user can receive a notification on his/her smartphone that the child user is using the parent user's table computing device to surf the Web on an unsecure network; as such, the notification can allow the parent user to make sure that the child does not share personal information (e.g., contact information, pictures, etc.) or download harmful files (e.g., malware, viruses, etc.).

Figure 7:
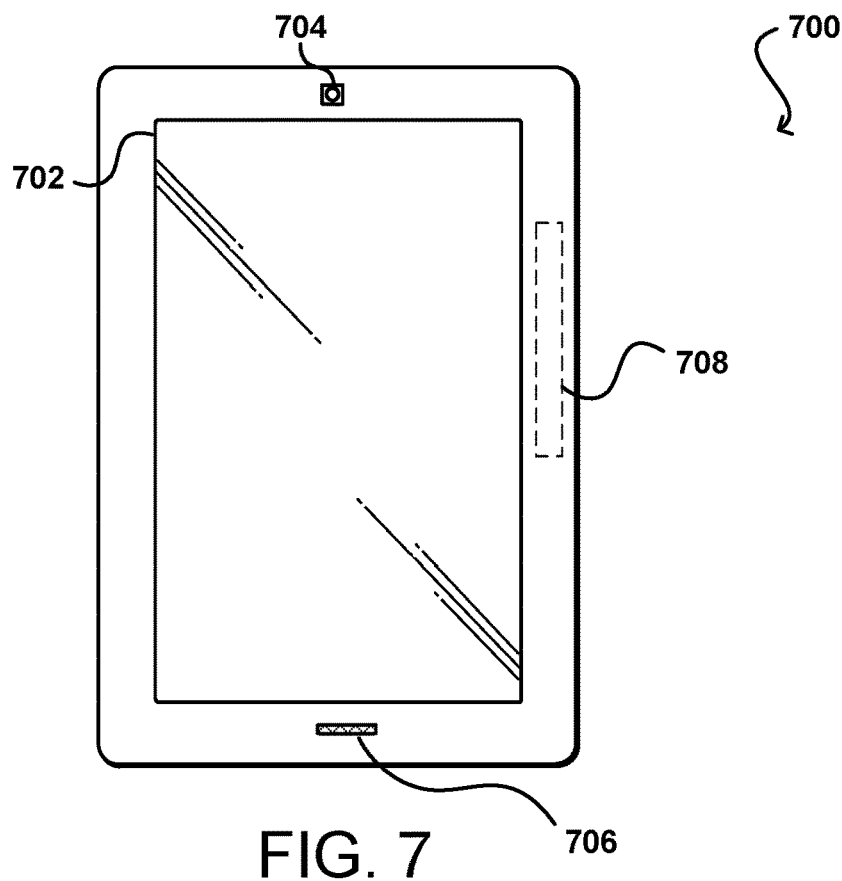
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
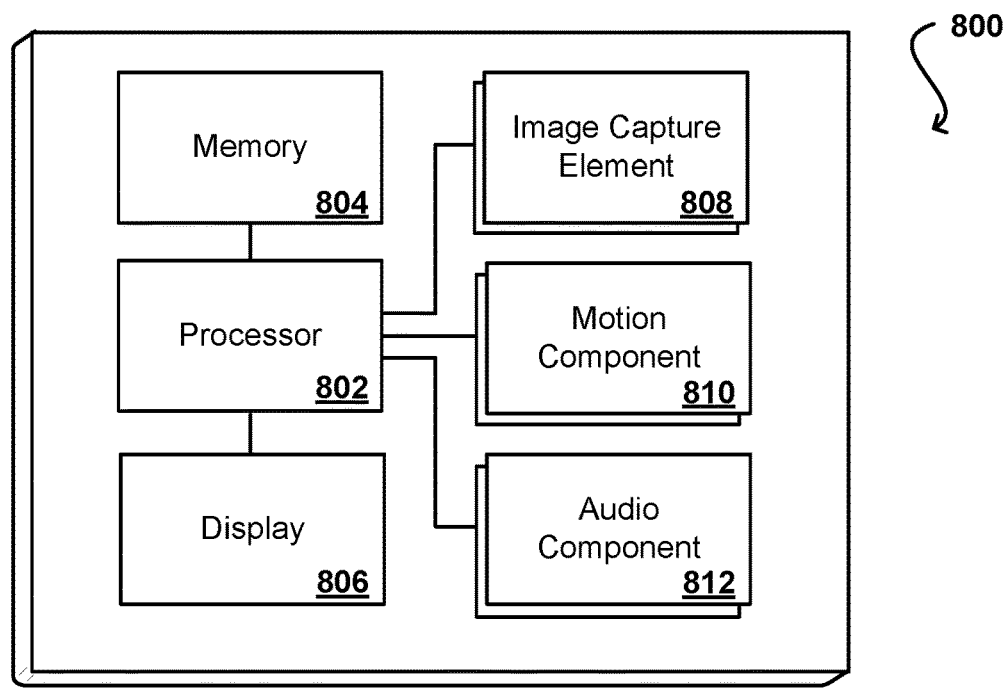
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omnidirectional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
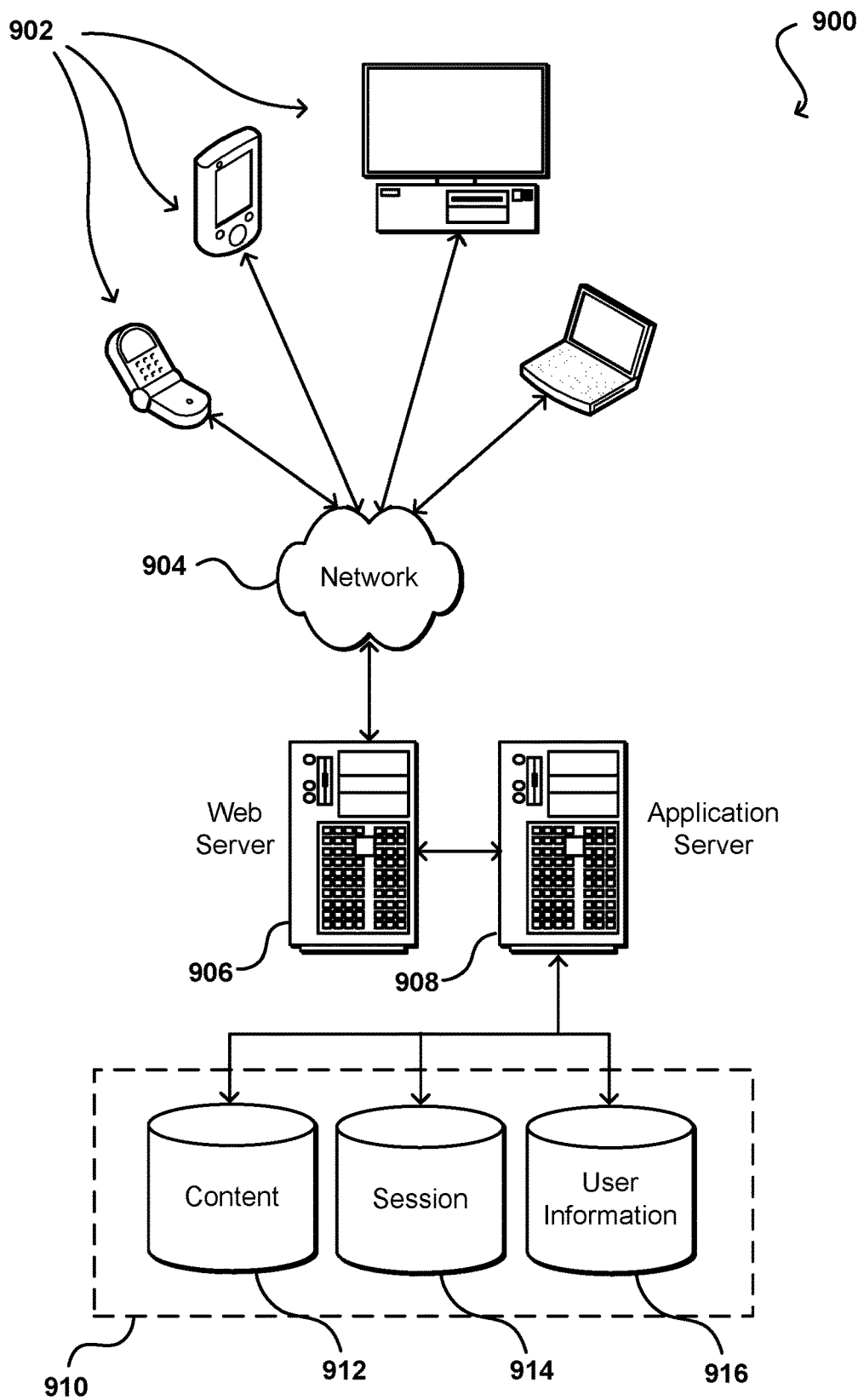
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising:
   receiving a selection of at least one element to be locked on a computing device, wherein the at least one element includes at least one of a portion of an application on the computing device or an operation performable by the application;
   receiving and storing biometric information to identify multiple accounts;
   configuring, based on the biometric information, a locking option corresponding to an associated account from the multiple accounts and a type of usage permission for the associated account to use the at least one element and to use one or more other elements associated with at least one other application;
   responsive to a first user interaction with the computing device, receiving first biometric data captured from a camera or biometric interface of the computing device;
   causing a lock to be applied to the at least one element responsive to determining that the first biometric data matches one of the multiple accounts other than the associated account, the lock corresponding to the locking option;
   enabling use of the one or more other elements on the computing device;
   capturing subsequent biometric data, from the camera or biometric interface of the computing device, periodically, in rapid succession, or continuously;
   receiving, responsive to a subsequent user interaction with the computing device, second biometric data, wherein the subsequent biometric data includes the second biometric data; and
   unlocking the at least one element responsive to determining that the second biometric data matches the associated account for the at least one element and to the one or more other elements associated with the at least one other application.

2. The computer-implemented method of claim 1, wherein the first or second biometric data includes a facial image, the computer-implemented method further comprising:
   capturing the facial image using a camera of the computing device;
   comparing the facial image captured to the biometric information stored to identify the multiple accounts;
   determining the associated account corresponding to the facial image; and
   unlocking the at least one element to provide the type of usage permission for the associated account to use the at least one element and to the one or more other elements associated with the at least one other application.

3. The computer-implemented method of claim 1, wherein the first or second biometric data includes a retina scan, the computer-implemented method further comprising:
   capturing the retina scan using a camera of the computing device;
   comparing the retina scan captured to the biometric information stored to identify the multiple accounts;
   determining the associated account corresponding to the retina scan; and
   unlocking the at least one element to provide the type of usage permission for the associated account to use the at least one element and to the one or more other elements associated with the at least one other application.

4. The computer-implemented method of claim 1, wherein the first or second biometric data includes a voice recording, the computer-implemented method further comprising:
   capturing the voice recording using an audio component of the computing device;
   comparing the voice recording captured to the biometric information stored to identify the multiple accounts;
   determining the associated account corresponding to the voice recording; and
   unlocking the at least one element to provide the type of usage permission for the associated account to use the at least one element and to the one or more other elements associated with the at least one other application.

5. The computer-implemented method of claim 1, wherein the first or second biometric data includes a fingerprint, the computer-implemented method further comprising:
   capturing the fingerprint using an interface of the computing device;
   comparing the fingerprint captured to the biometric information stored to identify the multiple accounts;
   determining the associated account corresponding to the fingerprint; and
   unlocking the at least one element to provide the type of usage permission for the associated account to use the at least one element and to the one or more other elements associated with the at least one other application.

6. The computer implemented method of claim 1, wherein causing the lock to be applied to the at least one element is initiated based at least in part upon one of a gesture input or a voice command.

7. The computer implemented method of claim 1, wherein the at least one element is associated with a shopping application in which money is spent on products or services, and wherein causing the lock to be applied to the at least one element operates to prevent spending money in the shopping application above a specified maximum spending threshold for the associated account.

8. The computer implemented method of claim 1, wherein the at least one element is associated with a finance application, and wherein causing the lock to be applied to the at least one element operates to prevent access to one or more accounts associated with the finance application for the associated account.

9. A computing device, comprising:
at least one processor; and
memory including instructions that, when executed by the at least one processor, cause the computing device to:
receive a selection of at least one element to be locked on the computing device, wherein the at least one element includes at least one of a portion of an application on the computing device or an operation performable by the application;
receive and store biometric information captured to identify multiple accounts;
configure, based on the biometric information, a locking option corresponding to an associated account from the multiple accounts and a type of usage permission for the associated account to use the at least one element and to one or more other elements associated with at least one other application;
responsive to a first user interaction with the computing device, receive first biometric data captured from a camera or biometric interface of the computing device;
cause a lock to be applied to the at least one element responsive to a determination that the first biometric data matches one of the multiple accounts other than the associated account, the lock corresponding to the locking option;
enable use of the one or more other elements on the computing device;
capture subsequent biometric data, from the camera or biometric interface of the computing device, periodically, in rapid succession, or continuously;
receive, responsive to a subsequent user interaction with the computing device, second biometric data, wherein the subsequent biometric data includes the second biometric data; and
unlock the at least one element responsive to a determination that the second biometric data matches the associated account for the at least one element and to the one or more other elements associated with the at least one other application.

10. The computing device of claim 9, wherein the first or second biometric data includes a facial image, wherein the instructions when executed further cause the computing device to:
capture the facial image using a camera of the computing device;
compare the facial image captured to the biometric information stored to identify the multiple accounts;
determine the associated account corresponding to the facial image; and
unlock the at least one element to provide the type of usage permission for the associated account to use the at least one element and to the one or more other elements associated with the at least one other application.

11. The computing device of claim 9, wherein the first or second biometric data includes a retina scan, wherein the instructions when executed further cause the computing device to:
capture the retina scan using a camera of the computing device;
compare the retina scan captured to the biometric information stored to identify the multiple accounts;
determine the associated account corresponding to the retina scan; and
unlock the at least one element to provide the type of usage permission for the associated account to use the at least one element and to the one or more other elements associated with the at least one other application.

12. The computing device of claim 9, wherein the first or second biometric data includes a fingerprint, wherein the instructions when executed further cause the computing device to:
capture the fingerprint using an interface of the computing device;
compare the fingerprint captured to the biometric information stored to identify the multiple accounts;
determine the associated account corresponding to the fingerprint; and
unlock the at least one element to provide the type of usage permission for the associated account to use the at least one element and to the one or more other elements associated with the at least one other application.

13. The computing device of claim 9, wherein the instructions to receive an indication of a selection of at least one element on the computing device to be locked when executed further cause the computing device to:
receive an indication of input, the input comprising a selection boundary in the interface of the application enclosing the at least one element;
determine each element enclosed by the selection boundary;
generate a notification including a list of each element enclosed by the selection boundary; and
receive, in response to generating the notification, an indication of a selection of the at least one element, wherein at least one element enclosed by the selection boundary is not included in the indication of the selection.

14. A non-transitory computer-readable storage medium storing instructions that, when executed by at least one processor of a computing system, causes the computing system to:
receive a selection of at least one element to be locked on a computing device, wherein the at least one element includes at least one of a portion of an application on the computing device or an operation performable by the application, the computing device communicatively coupled to the computing system via a network;
receive and store biometric information to identify multiple accounts;
configure, based on the biometric information, a locking option corresponding to an associated account from the multiple accounts and a type of usage permission for the associated account to use the at least one element and to one or more other elements associated with at least one other application;

responsive to a first user interaction with the computing device, receive first biometric data captured from a camera or biometric interface of the computing device;

cause a lock to be applied to the at least one element on the computing device responsive to a determination that the first biometric data matches one of the multiple accounts other than the associated account, the lock corresponding to the locking option;

enable use of the one or more other elements on the computing device;

capture subsequent biometric data, from the camera or biometric interface of the computing device, periodically, in rapid succession, or continuously;

receive, responsive to a subsequent user interaction with the computing device, second biometric data, wherein the subsequent biometric data includes the second biometric data; and unlock the at least one element responsive to a determination that the second biometric data matches the associated account for the at least one element and to the one or more other elements associated with the at least one other application.

15. The non-transitory computer-readable storage medium of claim 14, wherein the first or second biometric data includes a facial image, wherein the instructions to receive the selection of the at least one element on the computing device to be locked when executed further cause the computing system to:

receive, from the computing device, the facial image using the camera of the computing device;

compare the facial image captured to the biometric information stored to identify the multiple accounts;

determine the associated account corresponding to the facial image; and unlock the at least one element on the computing device to provide the type of usage permission for the associated account to use the at least one element and to the one or more other elements associated with the at least one other application.

16. The non-transitory computer-readable storage medium of claim 14, wherein the one or more other elements associated with at least one other application includes a capability to read pages of an electronic book, wherein the instructions to receive the selection of the at least one element on the computing device to be locked when executed further cause the computer system to:

determine, while the lock is applied to the at least one element on the computing device, that a number of the pages accessed on the computing device over a particular time period exceeds a threshold amount, wherein the threshold amount is based at least in part on a number of words included in the pages and the particular time period; and unlock the at least one element on the computing device.

17. The non-transitory computer-readable storage medium of claim 14, wherein the receiving of the selection of the at least one element, the causing the lock to be applied to the at least one element, and the unlocking of the at least one element are performed at least in part by a device external to the computing device, wherein the device is communicatively connected to the computing device and the computing system via the network.

18. The non-transitory computer-readable storage medium of claim 14, wherein causing the lock to be applied to the at least one element further comprises disabling an option to play media material above a specified maturity rating in a media rating system, wherein the media material includes at least one of a movie, a television show, a video, an audio, or a video game.

* * * * *